US008517166B2

(12) United States Patent
Jost et al.

(10) Patent No.: US 8,517,166 B2
(45) Date of Patent: Aug. 27, 2013

(54) MAILPIECE SELECTOR DEVICE FOR SELECTING MIXED MAILPIECES

(75) Inventors: Frédéric Jost, Deuil la Barre (FR); Emmanuel Bernard, Sannois (FR)

(73) Assignee: Neopost Technologies, Bagneux (FR)

( * ) Notice: Subject to any disclaimer, the term of this patent is extended or adjusted under 35 U.S.C. 154(b) by 97 days.

(21) Appl. No.: 13/194,370

(22) Filed: Jul. 29, 2011

(65) Prior Publication Data

US 2012/0090955 A1 Apr. 19, 2012

(30) Foreign Application Priority Data

Jul. 30, 2010 (EP) .................................... 10305850

(51) Int. Cl.
*B65G 29/00* (2006.01)

(52) U.S. Cl.
USPC .......................................... 198/624; 271/121

(58) Field of Classification Search
USPC ................ 198/604, 608, 624; 271/121, 122, 271/124; 414/796.9, 797.3, 797.7
See application file for complete search history.

(56) References Cited

U.S. PATENT DOCUMENTS

| | | | | |
|---|---|---|---|---|
| 4,312,503 | A | 1/1982 | Saxinger et al. | |
| 4,606,535 | A | 8/1986 | Larson | |
| 4,991,831 | A * | 2/1991 | Green | 271/121 |
| 5,011,124 | A * | 4/1991 | Sardano et al. | 271/35 |
| 5,584,475 | A | 12/1996 | Asada et al. | |
| 6,010,126 | A | 1/2000 | Mou | |
| 6,158,733 | A * | 12/2000 | Muraki | 271/127 |
| 7,066,461 | B2 * | 6/2006 | Asada | 271/121 |
| 7,607,656 | B2 * | 10/2009 | Yoshida | 271/121 |
| 2005/0275153 | A1 * | 12/2005 | Owa | 271/121 |
| 2006/0170147 | A1 | 8/2006 | Sata | |
| 2007/0132172 | A1 | 6/2007 | Mo | |

FOREIGN PATENT DOCUMENTS

| | | | |
|---|---|---|---|
| DE | 199 13 974 | C1 | 8/2000 |
| EP | 0 374 826 | A1 | 6/1990 |
| EP | 0 771 750 | A2 | 5/1997 |

* cited by examiner

*Primary Examiner* — James R Bidwell
(74) *Attorney, Agent, or Firm* — Sughrue Mion, PLLC

(57) ABSTRACT

A mailpiece selector device including at least a first guide that is mounted above a support plate for supporting mailpieces, and that is made up of a plurality of moving shoes for selecting the mailpieces one-by-one and for transporting them downstream along a referencing wall, at least one of the moving shoes having a varying coefficient of adhesion that increases going towards the support plate, the top portion of the moving shoe having a low coefficient of adhesion and the bottom portion having a high coefficient of adhesion.

10 Claims, 3 Drawing Sheets

MAILPIECE SELECTOR DEVICE FOR SELECTING MIXED MAILPIECES

TECHNICAL FIELD

The present invention relates to the field of mail handling and it relates more particularly to a mailpiece selector device implemented in an automatic feed module or "feeder" of a franking machine or "postage meter" for franking mailpieces.

PRIOR ART

Conventionally, a franking machine needs to be adapted to receive various types of mailpiece, such as documents, letters, or envelopes of greater or lesser thickness, typically lying in the range 0.1 millimeters (mm) to 20 mm. To this end, on the upstream side, such a franking machine often includes an automatic feed module making it possible to convey such mailpieces at various speeds. Such an automatic feed module usually includes means for receiving, selecting, transporting, and possibly closing such mailpieces.

A known automatic feeder includes a selector module having a structure having two guides that is particularly suitable for passing mailpieces of different thicknesses, and that makes it possible to reduce occurrences of double feeds to a very low level. Such double feeds, i.e. when two bunched-together mailpieces pass through together rather than singly, are highly detrimental because they give rise both to over-invoicing of one of the mailpieces (two mailpieces are weighed instead of a single mailpiece), and also to the underlying mailpiece not being franked and to the overlying mailpiece not being closed. In addition, mailpieces of large thickness, and more particularly such mailpieces that have windows, might be damaged or torn.

Unfortunately, when handling mixed mail, i.e. mail in which mailpieces of different formats and of different thicknesses succeed one another, the forces to be applied to the mailpieces are not the same. For mailpieces of small thickness, typically less than 6 mm, that force must be large so as to limit the number of double feeds towards the franking machine, whereas that force can be small for mailpieces of larger thickness.

OBJECT AND DEFINITION OF THE INVENTION

An object of the present invention is to mitigate the above-mentioned drawbacks by proposing a mailpiece selector device for a feeder of a franking machine that is particularly suitable for handling mailpieces of various formats and of various thicknesses.

This object is achieved by a mailpiece selector device comprising at least a first guide that is mounted above a support plate for supporting said mailpieces, and that is made up of a plurality of moving shoes for selecting said mailpieces one-by-one and for transporting them downstream along a referencing wall, wherein the moving shoe that is furthest away from said referencing wall has a constant coefficient of adhesion, and each of the other moving shoes has a varying coefficient of adhesion that increases going towards said support plate, the top portion of said moving shoe having a low coefficient of adhesion and the bottom portion having a high coefficient of adhesion.

By means of this specific structure of the shoes that can have a coefficient of adhesion that varies over their height, it is possible to handle, in succession, mailpieces of large thickness and mailpieces of small thickness from the same stack of mailpieces without any risk of double feeds. The quality of selection of the mailpieces of large thickness is thus improved because it is less likely to be subjected to jams.

Depending on the embodiment, said at least one of said plurality of moving shoes of said first guide may either be coated over substantially all of its height with an elastomer material of varying coefficient of adhesion that increases going downwards, it then being possible for the variation in the coefficient of adhesion to be obtained by causing the thickness of said elastomer material to vary, or by modifying the surface state of said elastomer material, or said mailpiece selector device may further comprise a flexible plate in the form of a comb disposed in front of said first guide, the teeth of said comb being made of a material having a low coefficient of friction and said at least one of said plurality of moving shoes against which the tooth facing it comes to be pressed in part while said mailpieces are passing through being coated over substantially all of its height with an elastomer material having a high coefficient of adhesion.

Preferably, said elastomer material is a polyurethane, and said flexible plate is made of a polycarbonate coated with polyethylene.

Advantageously, said elastomer material having a high coefficient of adhesion has a symmetrical structure making it possible for the position of said moving shoe to be inverted.

Preferably, the selector device further comprises a second guide that is made up of a plurality of moving shoes co-operating with a plurality of opposite selection belts.

The invention also provides a mailpiece feeder for a franking machine including an above-mentioned mailpiece selector device.

BRIEF DESCRIPTION OF THE DRAWINGS

Other characteristics and advantages of the present invention appear more clearly from the following description given by way of non-limiting indication and with reference to the accompanying drawings, in which.

DETAILED DESCRIPTION OF A PREFERRED EMBODIMENT OF THE INVENTION

An automatic mailpiece feed module conventionally has a feed zone formed essentially by a deck designed to receive a stack of mailpieces and including first transport means (rollers or belts) for driving said mailpieces downstream (and against a referencing wall) at a separation zone having a separator device in which said mailpieces are extracted one by one from the stack of mailpieces. Second transport means (rollers or belts) are, in general, provided at the outlet of said separation zone for the purpose of conveying the mailpieces extracted in this way downstream.

Figure 1:
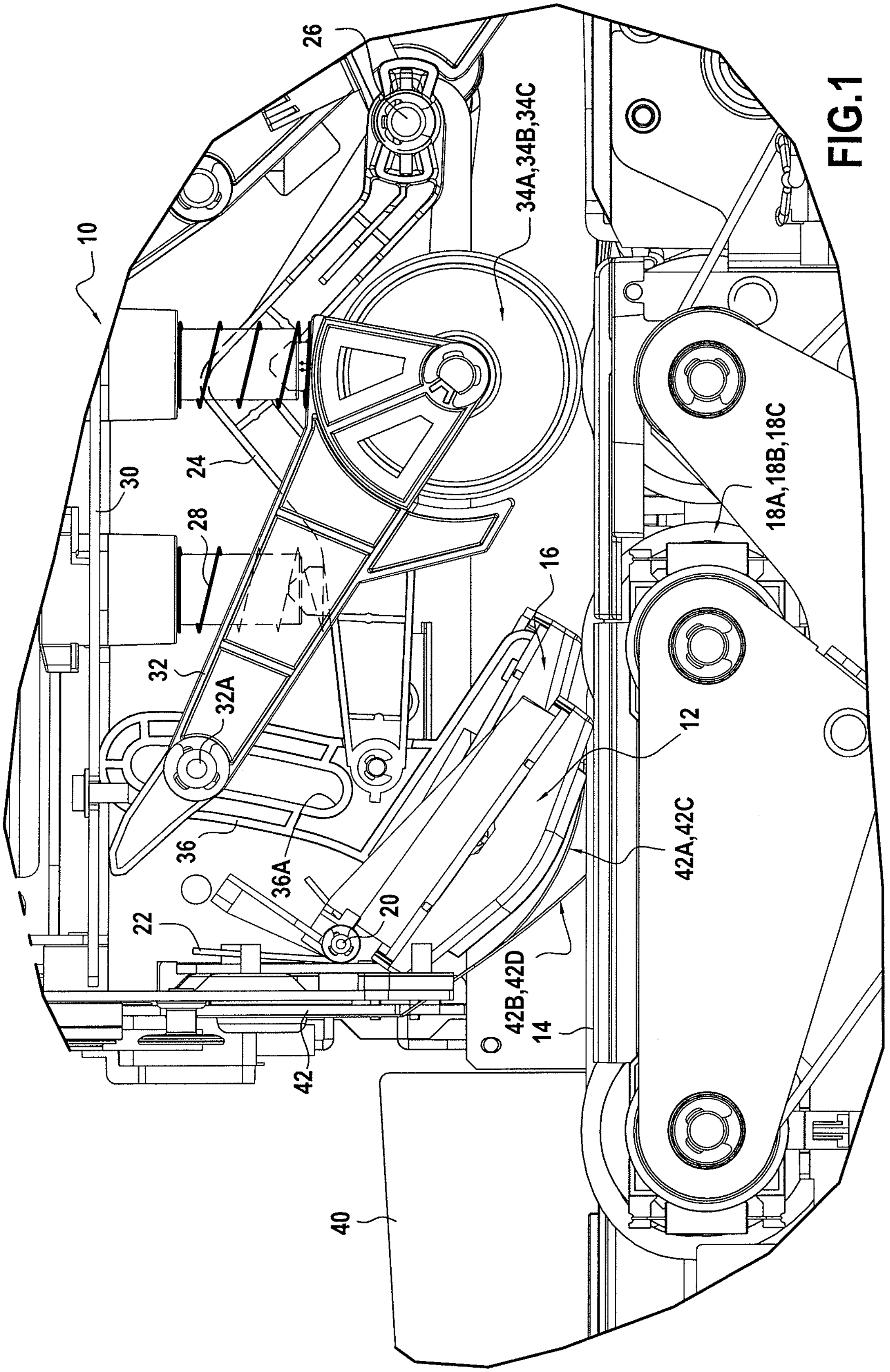
FIG. 1 is a longitudinal section view of a feed module including a mailpiece selector device of the invention.
Figure 2:
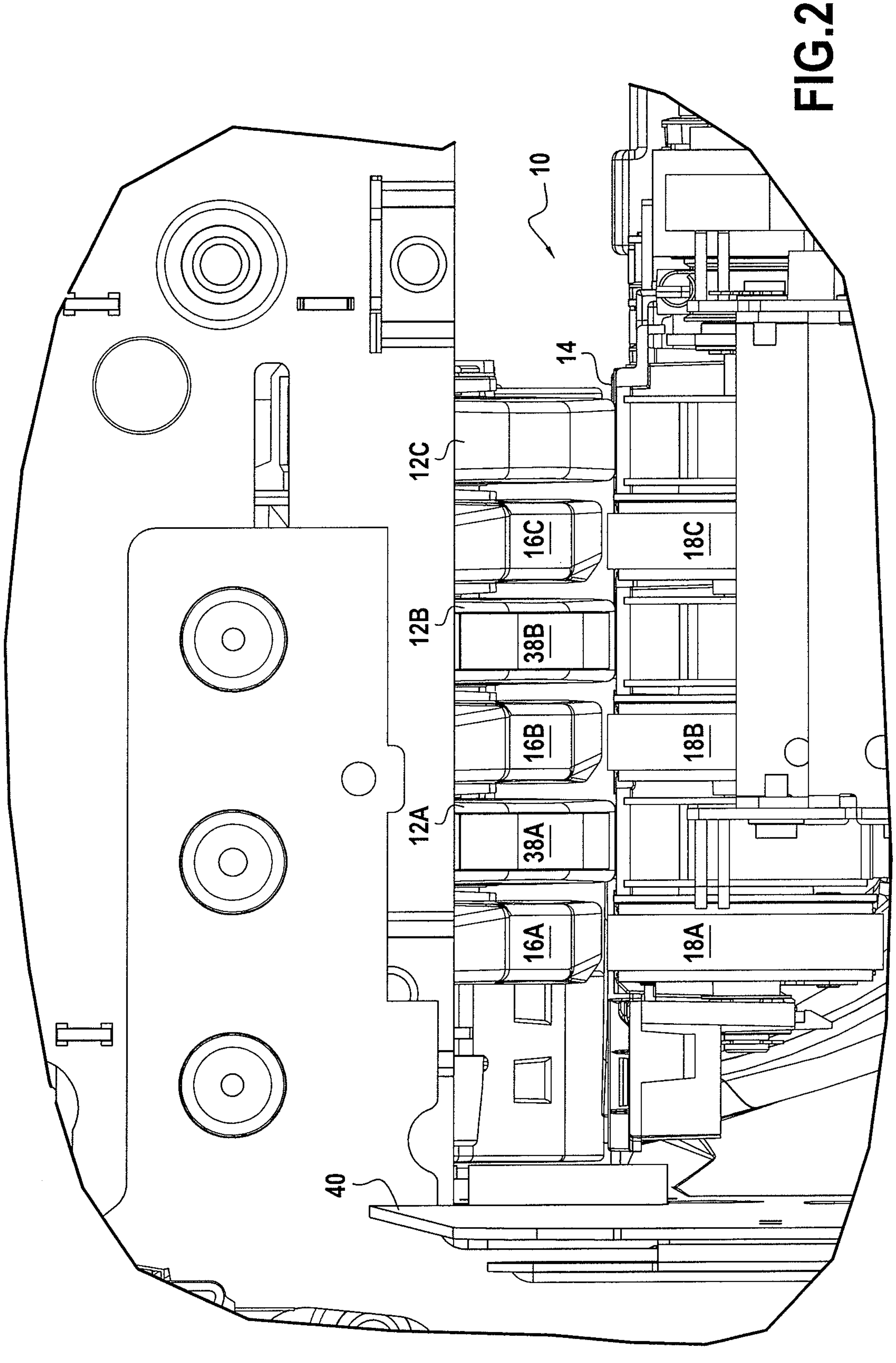
FIG. 2 is a front view showing the first and second guides in a first embodiment of the selector device of FIG. 1.
Figure 3:
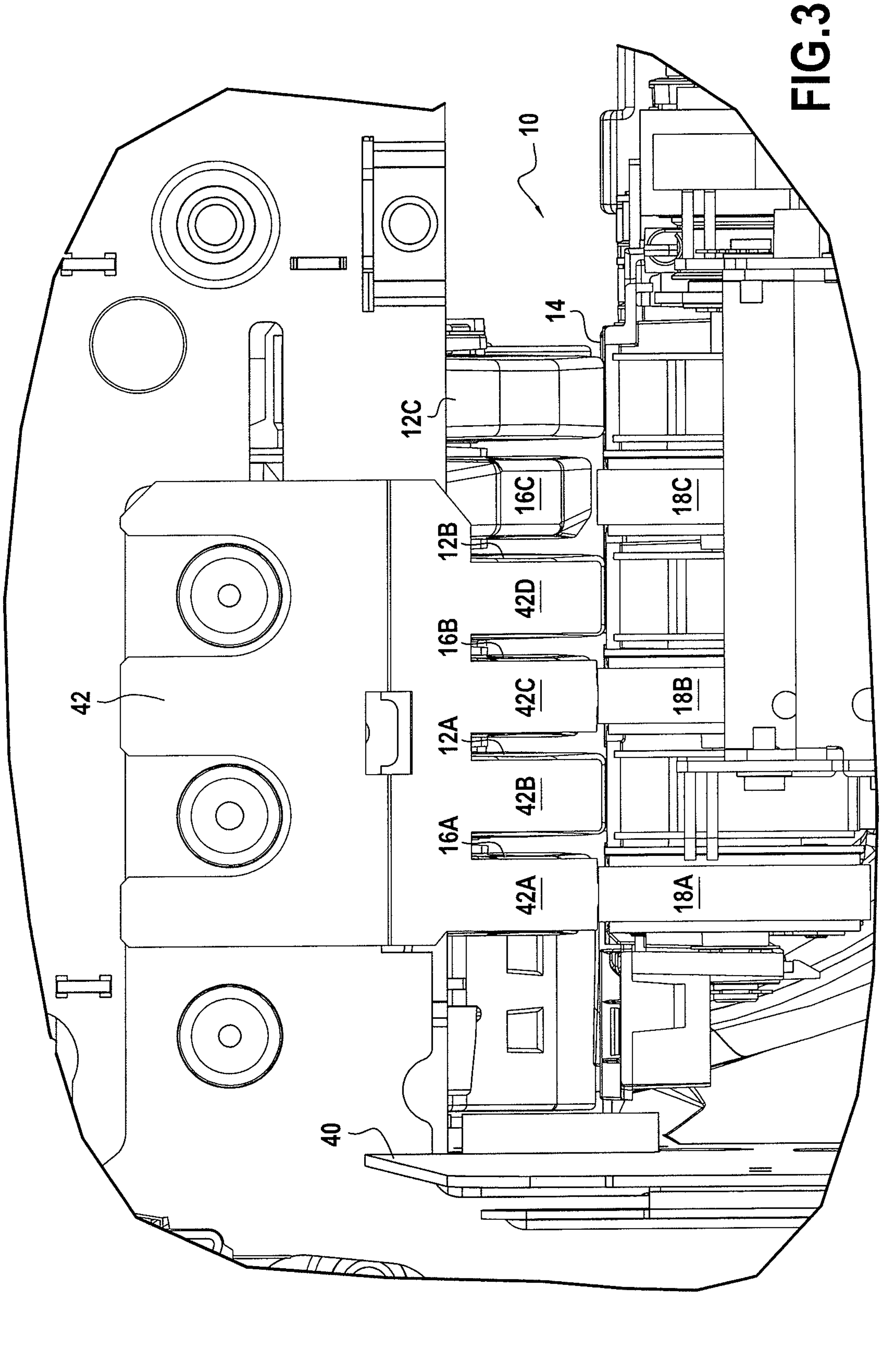
FIG. 3 is a front view showing the first and second guides in a second embodiment of the selector device of FIG. 1.

FIGS. 1 to 3 more precisely show a mailpiece separator device 10 of the invention that comprises, essentially, a "pre-selection" first guide 12 mounted above a support plate 14 forming the transport path for the mailpieces, followed by a "selection" second guide 16 co-operating with a plurality of adjacent and opposite selection belts 18A, 18B, 18C for selecting a single mailpiece and for transporting it downstream.

In the example shown, the first guide 12 is hinged about a pivot axis 20 and can pivot in opposition to resilient return means, e.g. the axial spring 22, as the mailpieces pass through. The second guide 16 can move vertically under the action of an arm 24 that can pivot about a pivot axis 26 in opposition to resilient return means, e.g. a compression spring 28, one end of which bears against a portion 30 of the frame of the selector device. The vertical movement of this second guide is guided in translation by a pin 32A of an arm 32 for supporting the transport rollers 34A, 34B, 34C, which pin moves in a slot 36A in a link arm 36 of said second guide. It should be noted that the pivot axis 26 of the second guide is offset upstream relative to the pivot axis 20 of the first guide.

As is known, the first and second guides 12, 16 are not disposed perpendicularly to the mailpiece transport path, but rather they are inclined downstream at about 45°. Each of them is constituted by a plurality of shoes, three such shoes being provided in the example shown, the three shoes 16A, 16B, 16C of the second guide being disposed above the three selection belts 18A, 18B, 18C, while the three shoes 12A, 12B, 12C of the first guide are disposed between said selection belts above the support plate 14 (see FIGS. 2 and 3).

In a first embodiment of the invention shown in FIG. 2, at least one and preferably two of the shoes 12A, 12B of the first guide is/are coated with an elastomer material 38A, 38B having a varying coefficient of adhesion. More particularly, the coefficient of adhesion increases going downwards, the top portion of the shoe provided with this coating having a low coefficient of adhesion, and the bottom portion having a high coefficient of adhesion. The third shoe 12C, which is the shoe that is furthest away from a referencing wall 40 for the mailpieces, and that is active only for mailpieces of large widths, is not provided with such a coating. The shoes of the second guide 16 are also provided with such coatings that are of high coefficient of adhesion (not referenced but visible in FIG. 1). The elastomer coating material of the first guide is preferably a polyurethane of varying thickness (the larger the thickness, the more the material deforms and maximizes the contact with the mailpiece) and the thickness increases going downwards from the top (about 2 mm) towards the bottom of the shoe (about 4 mm). It may also be a polyurethane of constant and uniform thickness that has been subjected to surface treatment so as to ensure that its roughness varies going downwards (the rougher the surface the less it is in contact with the mailpiece). The elastomer material may be adhesively bonded directly to the shoe or preferably be clipped thereto in a manner such that it is easy to replace once it is worn.

In a second embodiment of the invention, shown in FIG. 3, this variation in the coefficient of adhesion of the shoes of the first guide is procured merely by adding a flexible plate 42 in the form of a comb in front of the first guide 12. The teeth of this comb, which teeth are made of a material having a low coefficient of friction, then face the various shoes of the first and second guides, at least one of and preferably two of the shoes 12A, 12B of the first guide against which the tooth/teeth are pressed while the mailpieces are passing through being coated uniformly (and therefore with constant thickness) with an elastomer material having a high coefficient of adhesion. It is important to note that this pressing should have the effect of masking the shoe only partially so as to generate the desired difference in adhesion, which is low at the top portion (by contact with the tooth having a low coefficient of friction) and high at the bottom portion (by contact with the non-covered portion of the shoe that has a high coefficient of adhesion).

More precisely, in the example shown, the flexible plate forming the comb 42 has four teeth 42A, 42B, 42C, 42D, so that only the four shoes (two shoes 12A, 12B of the first guide and two shoes 16A, 16B of the second guide) that are closest to the referencing wall 40 are preceded by said teeth made of a material having a low coefficient of friction. Due to the first and second guides being offset, the teeth 42A, 42C facing the second guide 16 are longer than the teeth 42B, 42D facing the first guide 14, and they can optionally be preformed (see FIG. 1). This material is preferably a polycarbonate covered with polyethylene in order to increase the sliding effect. As in the first embodiment, the shoes of the second guide 16 are also provided with such a coating of an elastomer material having a high coefficient of adhesion.

It should be noted that the uniform elastomer material having a high coefficient of adherence preferably has a symmetrical structure enabling the position of the shoe to be inverted so as to double the length of its life (the worn shoe is then turned over).

The selector device of the invention operates as follows. With the mailpieces to be handled being dumped on the deck of the feed device, the envelopes of low thickness, i.e. having thicknesses of less than 2 mm, and the envelopes of standard thickness, i.e. having thicknesses lying in the range 2 mm to 6 mm, firstly come into contact with the bottom portions of the shoes of the first guide, and are therefore subjected to a large force due to the high coefficient of adhesion present in the bottom zones of the shoes, thereby avoiding double feeds. However, if such a double feed does, nevertheless, occur, the second guide then makes it possible for the underlying envelope to be extracted. Conversely, beyond this second threshold, the thicker envelopes come into contact with the top portions of the shoes of the first guide, where the coefficient of adhesion is lower, and, since the problem of double feeds no longer exists, the second guide has no specific effect for such situations.

Depending on the embodiment, the contact with the portions of the shoes of the first guide that are of low coefficient of adhesion takes place either directly with the elastomer material of the shoes (first embodiment in FIG. 2), or with the teeth of low coefficient of friction (embodiment in FIG. 3), which teeth cover said material and then perform the same function. The other teeth positioned in front of the shoes of the second guide merely press the mailpieces against the selection belts and, in the event that two mailpieces arrive together, provide a function of retaining the overlying mailpiece that slides on the underlying mailpiece, the underlying mailpiece then being driven by the selection belts.

Thus, with the present invention, handling mixed mail is greatly improved and it becomes possible to select the mailpieces very effectively while avoiding any double feeds and jams in the feeder. The periods of unavailability of the feeder are thus reduced.

What is claimed is:

1. A mailpiece selector device comprising at least a first guide that is mounted above a support plate for supporting mailpieces, and that is made up of a plurality of moving shoes for selecting said mailpieces one-by-one and for transporting them downstream along a referencing wall, wherein the moving shoe that is furthest away from said referencing wall has a constant coefficient of adhesion, and each of the other moving shoes has a varying coefficient of adhesion that increases going towards said support plate, the top portion of said moving shoe having a low coefficient of adhesion and the bottom portion having a high coefficient of adhesion.

2. A mailpiece selector device according to claim 1, wherein said other moving shoes are coated over substantially all of their height with an elastomer material of varying coefficient of adhesion that increases going towards said support plate.

3. A mailpiece selector device according to claim 2, wherein the variation in the coefficient of adhesion is obtained by causing the thickness of said elastomer material to vary.

4. A mailpiece selector device according to claim 2, wherein said variation in the coefficient of adhesion is obtained by modifying the surface state of said elastomer material.

5. A mailpiece selector device according to claim 1, further comprising a flexible plate in the form of a comb disposed in front of said first guide, the teeth of said comb being made of a material having a low coefficient of friction and, while said mailpieces are passing through, coming to be pressed in part against said other moving shoes that are facing them and that are coated over substantially all of their height with an elastomer material having a high coefficient of adhesion.

6. A mailpiece selector device according to claim 2, wherein said elastomer material is a polyurethane.

7. A mailpiece selector device according to claim 5, wherein said flexible plate is made of a polycarbonate coated with polyethylene.

8. A mailpiece selector device according to claim 5, wherein said elastomer material having a high coefficient of adhesion has a symmetrical structure making it possible for the position of said moving shoe to be inverted.

9. A mailpiece selector device according to claim 1, further comprising a second guide that is mounted above said support plate for supporting said mailpieces, and that is made up of a plurality of moving shoes co-operating with a plurality of opposite selection belts.

10. A mailpiece feeder for a franking machine including a mailpiece selector device according to claim 1.

* * * * *